United States Patent
Kim et al.

(10) Patent No.: US 8,462,247 B2
(45) Date of Patent: Jun. 11, 2013

(54) SINGLE GATE PIXEL AND OPERATION METHOD OF SINGLE GATE PIXEL

(75) Inventors: Seong Jin Kim, Hwaseong-si (KR); Sang Wook Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 427 days.

(21) Appl. No.: 12/656,092

(22) Filed: Jan. 15, 2010

(65) Prior Publication Data

US 2011/0025893 A1  Feb. 3, 2011

(30) Foreign Application Priority Data

Jul. 29, 2009 (KR) .................. 10-2009-0069568

(51) Int. Cl.
- H04N 3/14 (2006.01)
- H04N 5/232 (2006.01)
- H01L 31/062 (2006.01)
- H01L 27/00 (2006.01)

(52) U.S. Cl.
USPC ........... 348/308; 348/348; 348/294; 257/292; 250/208.1

(58) Field of Classification Search
USPC ....... 348/294, 302, 308, 348, 349; 250/208.1; 257/291–292
See application file for complete search history.

(56) References Cited

U.S. PATENT DOCUMENTS

| 5,898,168 | A  | * | 4/1999  | Gowda et al. | 250/208.1 |
| 7,271,835 | B2 | * | 9/2007  | Iizuka et al. | 348/294 |
| 7,626,626 | B2 | * | 12/2009 | Panicacci | 348/308 |
| 2009/0294632 | A1 | * | 12/2009 | Rhodes | 250/208.1 |
| 2010/0231771 | A1 | * | 9/2010  | Yaghmai | 348/308 |
| 2011/0019045 | A1 | * | 1/2011  | Lin | 348/294 |

FOREIGN PATENT DOCUMENTS

| JP | 2003-087663 | | 3/2003 |
| JP | 2006-246450 | | 9/2006 |
| JP | 2007-053217 | | 3/2007 |
| JP | 2007-096084 | | 4/2007 |
| JP | 2008-004692 | | 1/2008 |
| JP | 2008-103647 | * | 5/2008 |
| JP | 2009-047662 | | 3/2009 |
| KR | 10-2007-0004782 | | 1/2007 |

* cited by examiner

*Primary Examiner* — Nhan T Tran
(74) *Attorney, Agent, or Firm* — Staas & Halsey LLP

(57) ABSTRACT

A single gate pixel of an image sensor, architecture of the single gate pixel, and an operation method of the single gate pixel may be provided. The single gate pixel includes a first transfer unit to transfer a charge, generated by a light detector element, to an accumulation (ACC) node, a second transfer unit to transfer the charge, accumulated in the ACC node, to a Floating Diffusion (FD) node, a connection unit to connect the light detector element to a driving voltage, and a reset unit to reset a voltage of the FD node based on a reset control signal.

18 Claims, 9 Drawing Sheets

SINGLE GATE PIXEL AND OPERATION METHOD OF SINGLE GATE PIXEL

CROSS-REFERENCE TO RELATED APPLICATIONS

This application claims the benefit of Korean Patent Application No. 10-2009-0069568, filed on Jul. 29, 2009, in the Korean Intellectual Property Office, the disclosure of which is incorporated herein by reference.

BACKGROUND

1. Field

Example embodiments of the present disclosure relate to a single gate pixel of an image sensor, architecture of the single gate pixel, and an operation method of the single gate pixel.

2. Description of the Related Art

Currently, portable devices including one or more image sensors such as a digital camera, a mobile communication terminal, and the like have been developed. An image sensor in such a portable device may be configured as an array of pixels or photodiodes referred to as photosites. In general, a pixel may convert a photon of a wide spectrum band into an electron, without directly extracting a color from the light. Accordingly, a pixel of an image sensor is to receive light of only a band, required to obtain a color, from light of a wide spectrum band. A pixel of an image sensor may convert only a photon corresponding to a particular color into an electron by being combined with a color filter.

To obtain a three-dimensional (3D) image using an image sensor, information about a distance between an image sensor and an object as well as information about a color may be required. In general, a depth image may indicate an image reconfigured with respect to a distance between an image sensor and an object in related fields. A depth image may be obtained using infrared (IR) light that is outside the spectrum of light visible to a human.

A method of obtaining information about a distance between an image sensor and an object may be divided into an active method and a passive method. An active method may include a Time Of Flight (TOF) method and a triangulation scheme. In a TOF method, a time taken for an emitted ray to be reflected back from an object may be measured. In a triangulation scheme, a location of light, which is emitted and reflected by a laser, and the like, spaced apart from a sensor by a predetermined distance, may be sensed to measure a distance. A passive method may measure a distance between a sensor and an object using only image information without emitting light, and may be used in a stereo camera.

SUMMARY

One or more example embodiments of the present disclosure relate to a method and apparatus for obtaining a color image, which is represented using a color, and a depth image, which is represented using distance, using a single pixel may be provided.

One or more example embodiments of the present disclosure relate to a single gate pixel and an operation method of a single gate pixel to obtain a high resolution and high definition depth image may be provided.

According to example embodiments, there may be provided a single gate pixel, including: a first transfer unit to transfer a charge, generated by a light detector element to an accumulation (ACC) node; a second transfer unit to transfer the charge, accumulated in the ACC node, to a Floating Diffusion (FD) node; a connection unit to connect the light detector element to a driving voltage; and a reset unit to reset a voltage of the FD node based on a reset control signal.

The ACC node may be configured as a pinned photodiode.

A potential of the ACC node may be higher than a potential of the light detector element, and lower than a potential of the FD node.

The ACC node may be configured as a photogate.

The first transfer unit may be a transistor, a drain terminal of the transistor may be connected to the light detector element, and a source terminal of the transistor may be connected to the ACC node.

The second transfer unit may be a transistor, a drain terminal of the transistor may be connected to the ACC node, and a source terminal of the transistor may be connected to the FD node.

The first transfer unit may transfer the charge, generated by the light detector element, to the ACC node during an active time period, and electrically disconnect the light detector element from the ACC node during an inactive time period.

The reset control signal may be activated when the charge accumulation is completed.

The reset control signal may be activated, a potential of the FD node may be read out, and the second transfer unit may transfer the charge, accumulated in the ACC node, to the FD node.

According to example embodiments, there may be provided an operation method of a single gate pixel, the operation method including: transferring a charge, generated by a light detector element, to an ACC node; accumulating the charge in the ACC node; transferring the accumulated charge to a FD node; and resetting a voltage of the FD node based on a reset control signal.

The transferring the charge to the ACC node may transfer the charge, generated by the light detector element, to the ACC node during an active time period, and electrically disconnect the light detector element from the ACC node during an inactive time period.

The operation method may further include: activating the reset control signal and reading out a potential of the FD node; and transferring the charge, accumulated in the ACC node, to the FD node.

Additional aspects of the example embodiments will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

Figure 1:
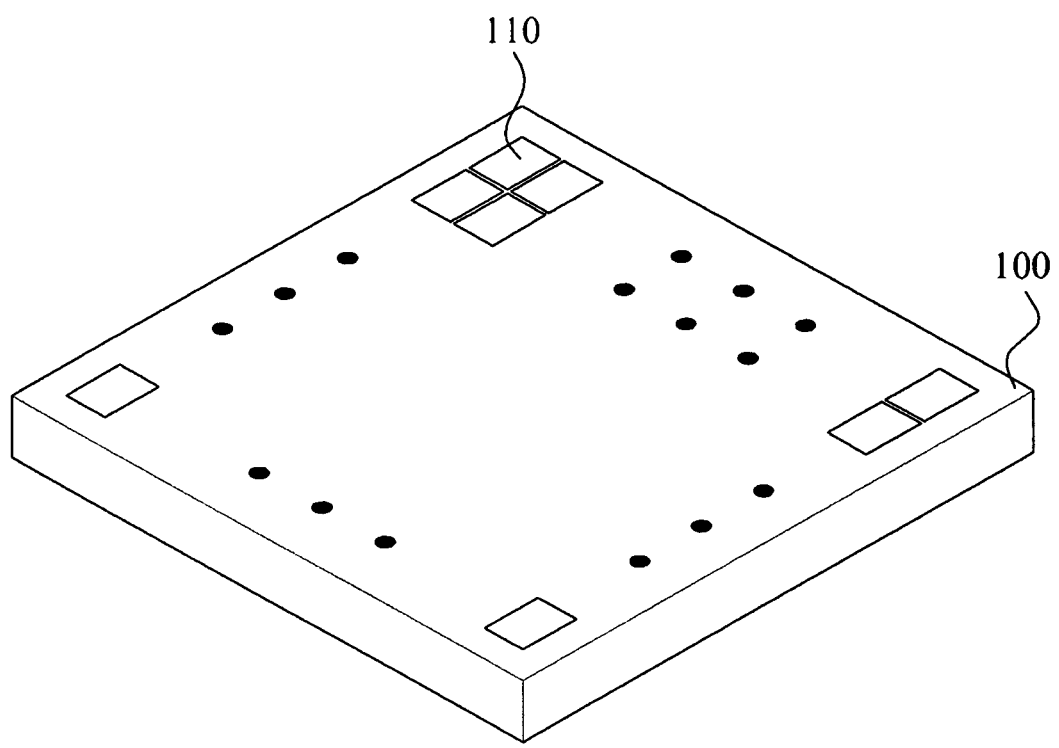
FIG. 1 illustrates a diagram of an image sensor according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Example embodiments may be applied to an image sensor. Although the image sensor according to example embodiments may be applied to a surveillance camera system, a motion recognition system, a robot vision system, a distance recognition system for vehicles, and a technology for separating a background from a foreground based on depth information, example embodiments may not be limited thereto.

FIG. 1 illustrates a diagram of an image sensor 100 according to example embodiments.

Referring to FIG. 1, the image sensor 100 may include a plurality of pixels. A pixel 110 may be any one of the plurality of pixels included in the image sensor 100. In this example, the pixel 110 may have a single gate architecture according to example embodiments.

The plurality of pixels may form an array. For example, when 240 pixels form a single row, and 320 pixels form a single column, the image sensor 100 may have a resolution of 320×240. In this example, a pixel array of the image sensor 100 may include 320 rows and 240 columns. Each pixel of the image sensor 100 may be accessed based on a combination of a row address and a column address. In this example, pixels included in a single row may be connected to a single bit line.

Figure 2:
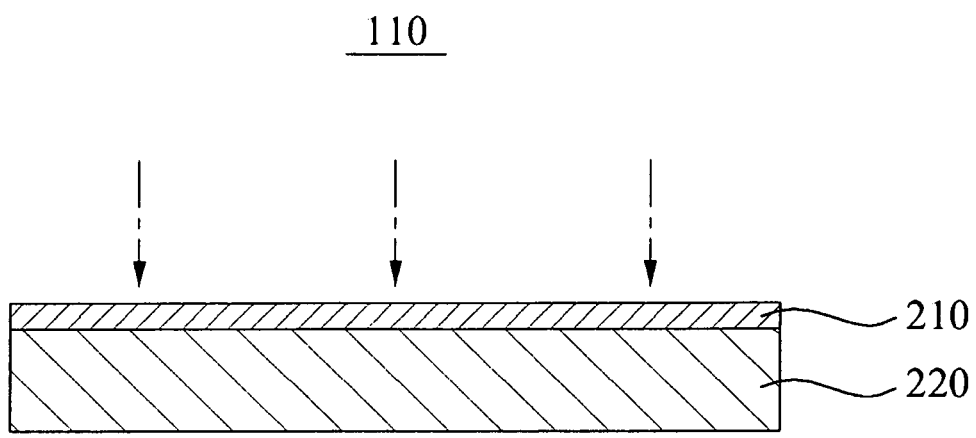
FIG. 2 illustrates an example of a cross-sectional view of a pixel of FIG. 1.

FIG. 2 illustrates an example of a cross-sectional view of the pixel 110 of FIG. 1.

Referring to FIG. 2, the pixel 110 may include a filter 210 and a light detector element 220.

A select visible light component may be passed through the filter 210 to the light detector element 220. In this example, the filter 210 may pass a specific band of the visible light component according to a type of the filter. For example, the filter 210 may pass a band corresponding to Red light, a band corresponding to Green light, or a band corresponding to Blue light, depending on a bandwidth filtering designed for the filter.

The image sensor 100 may include a red pixel including a red filter, a green pixel including a green filter, and a blue pixel including a blue filter. A single color pixel may be formed when the red pixel, the green pixel, and the blue pixel are adjacent to each other.

Also, the filter 210 may filter an invisible light component to the light detector element 220. The filter 210 may filter a band, corresponding to an infrared (IR) light, from among the invisible light component to the light detector element 220.

The light detector element 220 may generate a charge in response to the light filtered through the filter 210. As an example, the light detector element 220 may be a photodiode.

Figure 3:
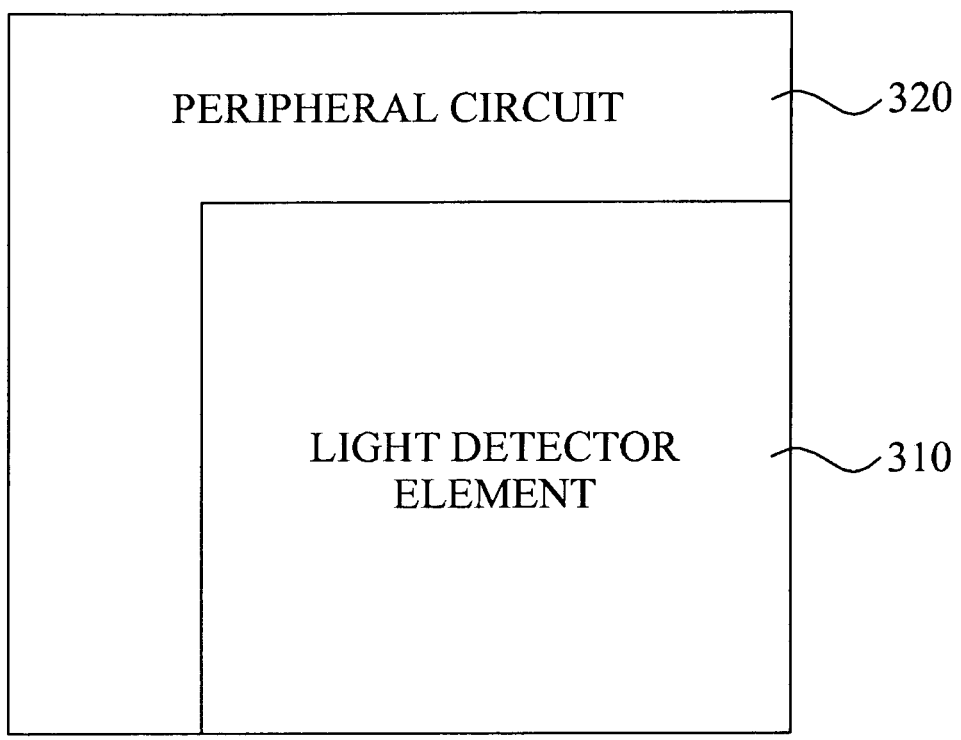
FIG. 3 illustrates an example of a top view of the pixel of FIG. 2.

FIG. 3 illustrates an example of a top view of the pixel 110 of FIG. 2.

Referring to FIG. 3, the pixel 110 may include a light detector element 310 and a peripheral circuit 320. In an embodiment, more than a half of the size of the pixel 110 may be used for the light detector element 310. The peripheral circuit 320 may transfer a light detector electric current or light detector charges generated by the light detector element 310 to a bit line, for example. The light detector current and light detector charge may be generated by the light detector element 310.

Figure 4:
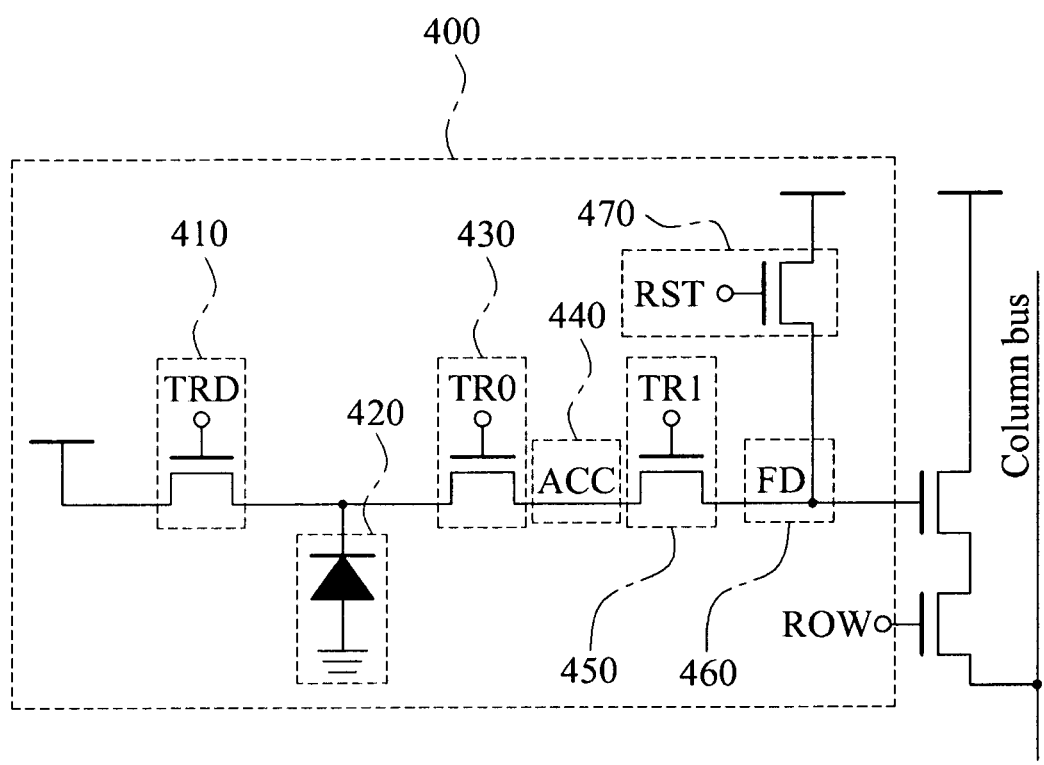
FIG. 4 illustrates an example of an equivalent circuit of a single gate pixel according to example embodiments.

FIG. 4 illustrates an example of an equivalent circuit of a single gate pixel 400 according to example embodiments. In this example, a pixel having a single readout path may be defined as a single gate pixel.

The illustrated RST signal is an example signal used to perform a reset operation and the ROW signal is an example signal to indicate that a row of an array is selected. The illustrated TRD, TR0, and TR1 signals are further example signals to control a transfer operation for respective elements 410, 430, and 450.

Referring to FIG. 4, the single gate pixel 400 may include a connection unit 410, a light detector element 420, a first transfer unit 430, an accumulation (ACC) node 440, a second transfer unit 450, a Floating Diffusion (FD) node 460, and a reset unit 470.

The connection unit 410 may be configured as a transistor. Here, the transistor of the connection unit 410 may be referred to as a 'TRD transistor'. A gate terminal of the TRD transistor may be connected to a TRD signal, and a drain terminal may be connected to a power VDD node. Also, a source terminal may be connected to the light detector element 420.

The light detector element 420 may be configured as a photodiode. In this instance, the photodiode may sense light. The photodiode may sense light of a specific wavelength by being combined with a specific filter. Also, the photodiode may generate an Electron Hole Pair (EHP) based on the sensed light. Here, the photodiode may be a general N+/P– sub photodiode or a pinned photodiode with P+/N/P– sub architecture. The pinned photodiode may maintain a pinning voltage and reduce a dark current, when operated. When the light detector element 420 is configured as a pinned photodiode, the light detector element 420 may form a Pinned Photodiode (PPD) node in the single gate pixel 400.

The first transfer unit 430 may transfer a charge, generated in the light detector element 420, to the ACC node 440. In this example the first transfer unit 430 may be configured as a transistor. The transistor of the first transfer unit 430 may be referred to as a 'TR0 transistor'. A gate terminal of the TR0 transistor may be connected to the TR0 signal, a drain terminal of the TR0 transistor may be connected to the light detector element 420, and a source terminal of the TR0 transistor may be connected to the ACC node 440.

The ACC node 440 may accumulate a charge transferred from the first transfer unit 430. In this instance, the ACC node 440 may have P+/N/P– sub architecture. Accordingly, the ACC node 440 may maintain a pinning voltage since an N area is fully depleted similar to the pinned photodiode. In this example, a potential of the ACC node 440 may be higher than a potential of the light detector element 420, and lower than a potential of the FD node 460. An electric field is to be formed to smoothly transfer a charge, formed in the PPD node, to the ACC node 440. Accordingly, the potential of the ACC node 440 is to be higher than the potential of the light detector element 420.

Figure 9:
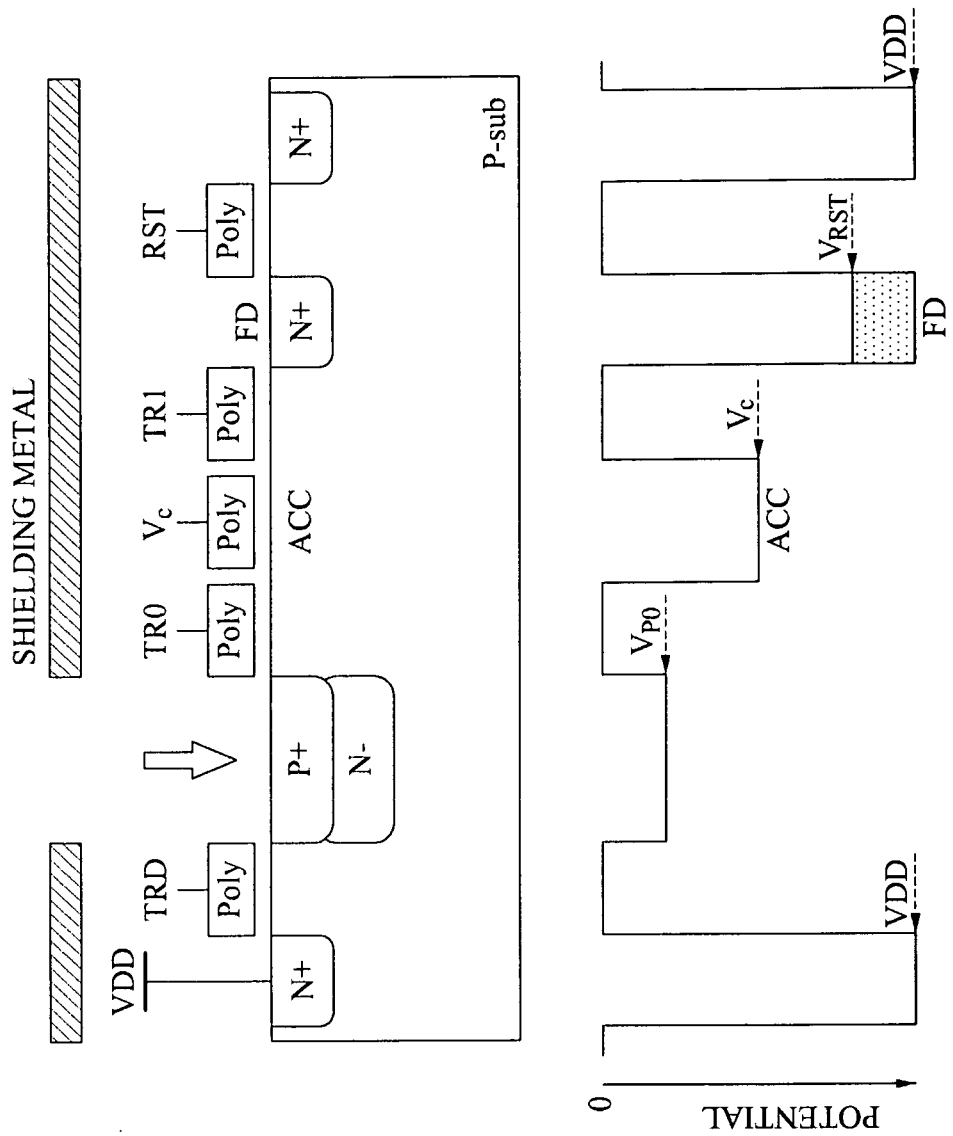
FIG. 9 illustrates another example of a cross-sectional view of a semiconductor device corresponding to FIG. 4.

According to example embodiments, the ACC node 440 may be configured as a photogate as illustrated in FIG. 9.

The second transfer unit 450 may transfer a charge, accumulated in the ACC node 440, to the FD node 460. In this example, the second transfer unit 450 may be configured as a transistor. The transistor of the second transfer unit 450 may be referred to as a 'TR1 transistor'. A gate terminal of the TR1 transistor may be connected to the TR1 signal, a drain terminal of the TR1 transistor may be connected to the ACC node 440, and a source terminal of the TR1 transistor may be connected to the FD node 460.

The FD node 460 may be connected to the reset unit 470 and form a readout path.

The reset unit 470 may reset a voltage of the FD node 460 based on the RST signal, which is the reset control signal. In this example, the reset control signal may be activated when the charge accumulation is completed in the FD node 460. Here, the unit 470 may be configured as a transistor. The transistor of the reset unit 470 may be referred to as an 'RST transistor'. A gate terminal of the RST transistor may be connected to the RST signal, a drain terminal of the RST transistor may be connected to the VDD, and a source terminal of the RST transistor may be connected to the FD node 460.

An operation of the single gate pixel 400 may be described as follows.

The first transfer unit 430 may transfer a charge, generated by the light detector element 420, to the FD node 460 during an active time period, and electrically disconnect the light detector element 420 from the ACC node 460 during an inactive time period. In this example, the active time period may indicate a time in which the TRD signal, the TR0 signal, the TR1 signal, and the RST signal are activated. Conversely, the inactive time period may indicate a time in which the TRD signal, the TR0 signal, the TR1 signal, and the RST signal are deactivated.

After activating the RST signal, the potential of the FD node 460 may be read out. After the readout of the potential of the FD node 460, the second transfer unit 450 may transfer the charge, accumulated in the ACC node 440, to the FD node 460.

Figure 5:
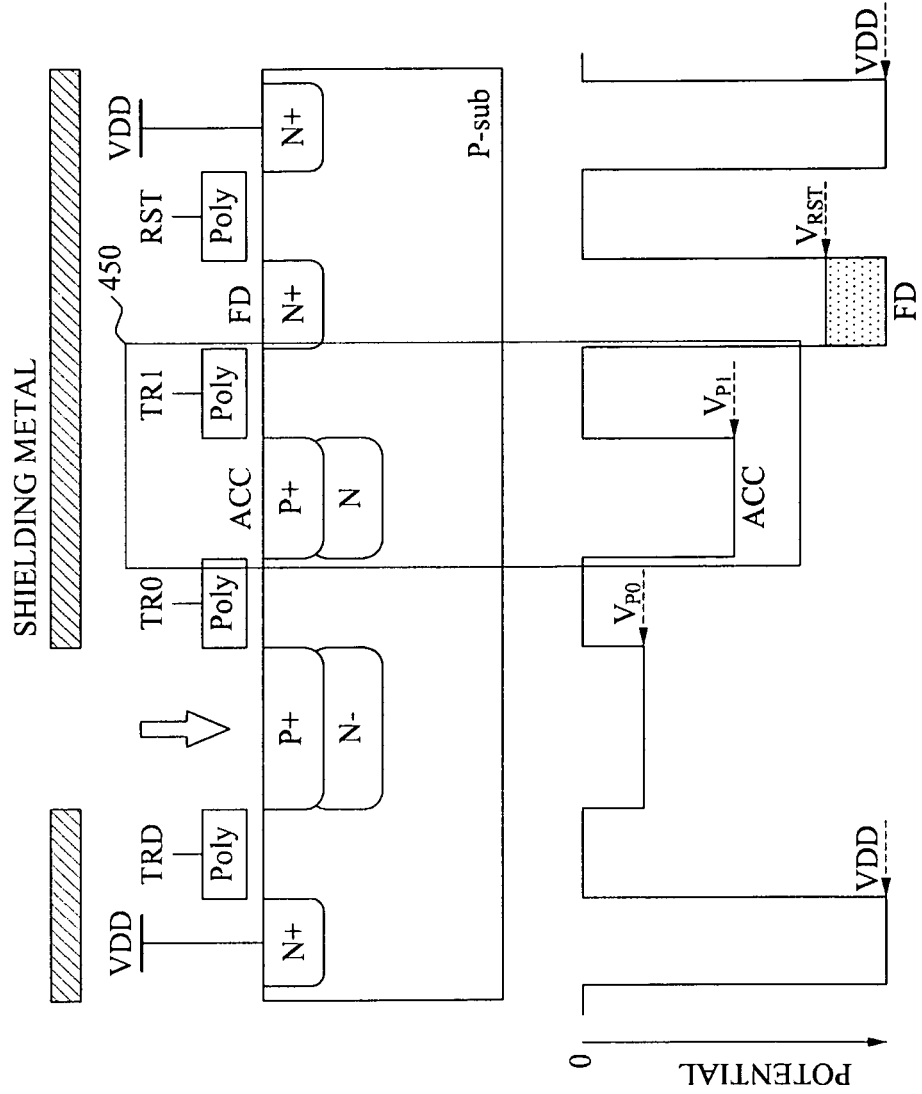
FIG. 5 illustrates an example of a cross-sectional view of a portion of a semiconductor device corresponding to FIG. 4 and an electric potential diagram.

FIG. 5 illustrates an example of a cross-sectional view of a portion of a semiconductor device corresponding to FIG. 4 and an electric potential diagram.

Referring to FIG. 5, a pinning voltage of each of a PPD node and an ACC node may be, respectively, $V_{P0}$ and $V_{P1}$. In this example, $V_{P0}$ and $V_{P1}$ may be determined by a doping density and a junction depth. Here, each N area may be represented as one of N− and N to distinguish the doping density of the PPD node from the doping density of the ACC node.

An electric field is to be formed to smoothly transfer a charge, formed in the PPD node, to the ACC node. Accordingly, $V_{P1}$ may be greater than $V_{P0}$. Also, $V_{P1}$ is to be less than $V_{RST}$. That is, the doping density and the junction depth of each of the nodes may be determined to be '$V_{P0} < V_{P1} < V_{RST}$'. In this example, a size of the PPD node may be associated with a sensitivity of obtaining a depth image. Accordingly, the sensitivity of obtaining a depth image may increase as the size of the PPD node increases. Also, when the depth image is obtained, a TR0 signal and a TRD signal may be periodically activated, and a charge generated by a reflected light may be transferred to the ACC node and a VDD node. Accordingly, a well capacity of the PPD node may be small enough to be negligible. That is, a width of the PPD node may increase and $V_{P0}$ may be insignificant. In this example, the size of the ACC node may be determined based on the well capacity. As the ACC node and the FD node increase, a fill factor may decrease.

Figure 6:
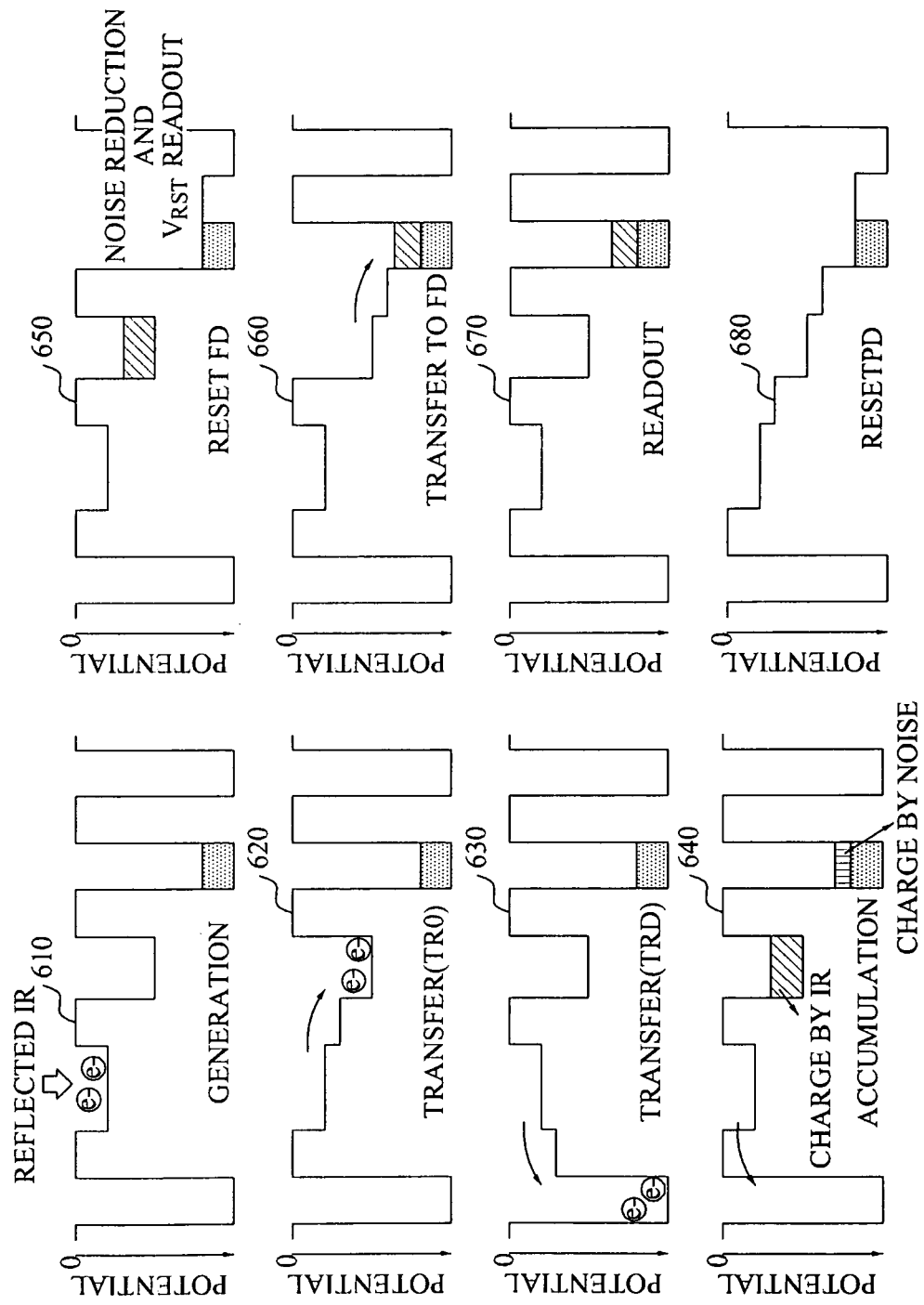
FIG. 6 illustrates a potential change and a charge transfer over time of FIG. 5.

FIG. 6 illustrates a potential change and a charge transfer over time of FIG. 5.

Referring to FIG. 6, an electron may be generated by reflected IR signal in a PPD node in a first time period 610. At the same time, in a second time period 620, a potential of a TR0 signal may change from 0 to a voltage of a VDD or voltage between $V_{P0}$ and $V_{P1}$. A charge may be generated in a PPD node, and the generated charge may be transferred to an ACC node due to the change of the TR0. In a third time period 630, the potential of the TR0 signal may be changed to 0, and a potential of the TRD signal may increase. A charge generated in the third time period 630 may be transferred to the VDD node. In this example, a voltage of the VDD node may not be changed. A frequency and a phase may be determined based on a modulation waveform of emitted IR signal in the potential change and the charge transfer in the second and third time period. Since a frequency is generally at least 10 MHz, which is relatively high, the number of electrons generated during a single transfer may be very few. Accordingly, the operation from the first time period 610 and the third time period 630 may be repeated and the charge may have been accumulated in a fourth time 640. The total operation time may be approximately 30 ms. However, the all operation time may not be limited to the example.

Also, a noise charge may be accumulated in the FD node due to a leakage current during the total operation time. In FIG. 6, a portion represented as a dotted line in the FD node may indicate a charge generated when reset due to $V_{th}$ of a reset transistor. The charge generated on reset may vary depending on a size of an RST signal. Since the ACC node has a PPD configuration, only accumulation charge may be accumulated in the ACC node almost without a leakage current.

After the accumulation, a potential of the RST signal may rise to a voltage level of the VDD and the FD node may be reset in a fifth time period 650. In this example, the noise charge, accumulated in the FD node by a leakage current, may fade, and a FD node voltage ($V_{RST}$) may be readout. Also, a kTC noise, which is a random noise, may be generated in the FD node by the reset operation.

After the reset readout has been completed, a potential of a TR1 signal may increase up to a voltage of the VDD or voltage between $V_{P1}$ and $V_{RST}$, and a charge of the ACC node may be transferred to the FD node in a sixth time period 660.

In a seventh time period 670, a voltage of the FD node may be changed due to the charge transferred from the ACC node, and a value ($V_{SIG}$) may be readout. In this example, $V_{SIG}$ may be a value changed from $V_{RST}$. Accordingly, the FD node may have the kTC noise generated in the fifth time period 650. The kTC noise may be removed by a difference between $V_{SIG}$ and $V_{RST}$.

In an eighth time period 680, the TR0 signal, the TR1 signal, and the RST signal may be activated, and the PPD node, the ACC node, and the FD node may be reset. Subsequently, the potential change and the charge transfer may be repeated again from the first time period 610. Also, the TRD signal, the TR0 signal, the TR1 signal, and the RST signal may be provided in a providing unit located outside of the single gate pixel. The providing unit may not be illustrated in FIG. 6.

Figure 7:
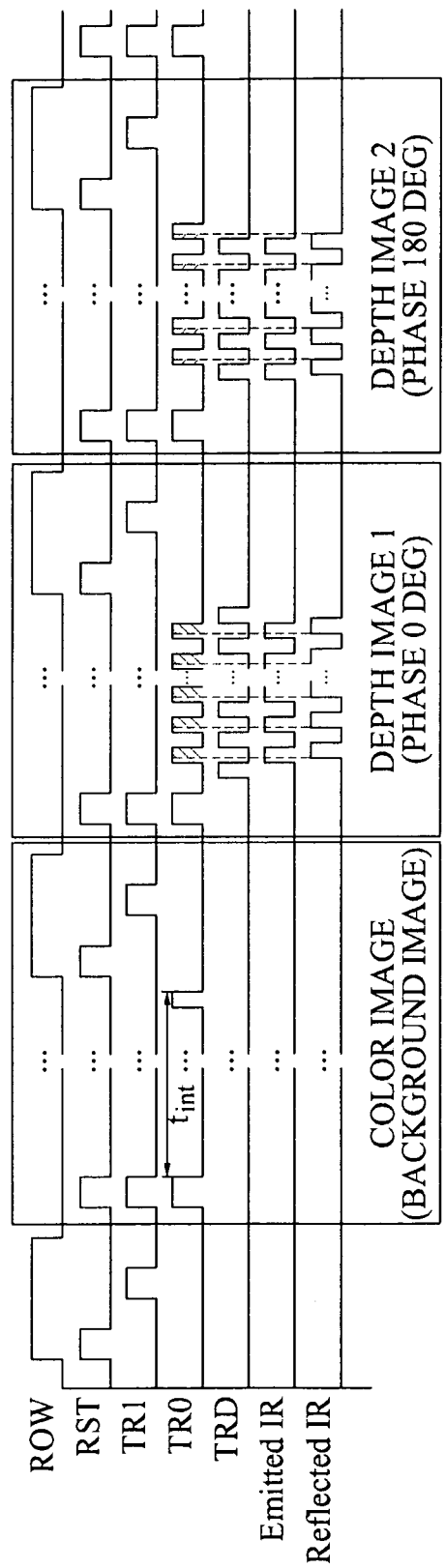
FIG. 7 illustrates a timing diagram of an example of an operation of an image sensor according to example embodiments.

FIG. 7 illustrates a timing diagram of an example of an operation of an image sensor according to example embodiments.

The timing diagram of FIG. 7 may be applied to an operation of obtaining a 'depth image' or a 'color and depth image'. In this example, the image sensor may be configured as a single gate pixel as illustrated, for example, at FIG. 4. The timing diagram of FIG. 5 may correspond to a single frame. A video may be obtained by repeatedly applying the timing diagram of FIG. 5.

The image sensor may collect a charge for a predetermined time without an emitted IR signal, and read a value of collected charges. In this example, a generated image may be a background image. Also, although a TR0 signal has been changed only once during an integration time ($t_{int}$), the TR0 signal may be configured to change a number of times depending on a well capacity of a PPD and an ACC node.

To obtain a depth image after obtaining a color image, an IR pulse of a modulated frequency is to be emitted and an IR light that is reflected back is to be detected. An operation corresponding to a depth frame may include a first measurement operation and a second measurement operation.

In the first measurement operation, a signal having a phase difference of '0' with the IR pulse of the modulated frequency may be applied to the TR0 signal, and a signal having a phase opposite to the TR0 signal may be applied to a TRD signal. In FIG. 7, a portion represented by oblique lines may indicate a portion where a waveform of a reflected IR and a waveform of the TR0 signal are overlapped. In this example, the image sensor may accumulate only a charge, generated in the oblique lines in FIG. 7, in the ACC node.

The image sensor may read the accumulated charge, when the charge accumulation in the ACC node is completed. Subsequently, the image sensor may perform the second measurement operation. In the second measurement operation, the image sensor may reverse the waveform of the TR0 signal by 180 degrees, and thereby may obtain the depth image. In this example, the reversal of the waveform of the TR0 signal may be required to remove an effect of reflectivity of an object.

Figure 8:
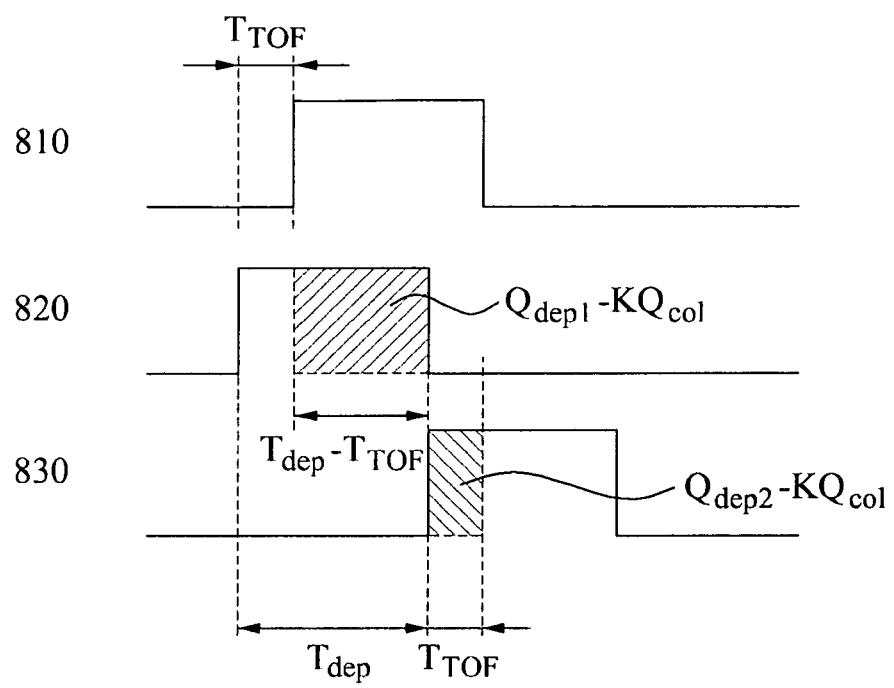
FIG. 8 illustrates a detailed operation of the image sensor of FIG. 7.

FIG. 8 illustrates a detailed operation of the image sensor of FIG. 7.

A waveform 810 illustrates a waveform of a reflected IR signal.

A waveform 820 illustrates a waveform of a TR0 signal.

A waveform 830 illustrates a waveform of a TRD signal.

$T_{dep}$ may denote a time period that an IR signal is emitted. A shaded portion may denote a charge amount transferred to the ACC node from among charge generated by a reflected IR signal. $T_{TOF}$ may denote a time spent when the emitted IR signal is reflected by an object and the reflected IR signal is sensed by the image sensor. In this example, a phase difference between the waveform 820 of the TR0 signal and a waveform of an emitted light may be '0' degrees, and a phase difference between the waveform 830 of the TRD signal and the waveform of the emitted light may be '180' degrees. TOF is to obtain only the charge generated by the reflected IR signal. In this example, TOF may be obtained using images obtained during the periods of 'color image', 'depth image 1', and 'depth image 2' of FIG. 7, according to Equation 1 and Equation 2, as given as below.

$$Q_{depth1} = n(t_{depth} \cdot i_{color} + (t_{depth} - t_{TOF})i_{depth}) \quad \text{Equation 1}$$
$$Q_{depth2} = n(t_{depth} \cdot i_{color} + t_{TOF} \cdot i_{depth})$$
$$Q_{color} = t_{color} \cdot i_{color}$$
$$t_{color} = \frac{n \cdot t_{depth}}{k}$$

$$\frac{Q_{depth1} - k \cdot Q_{color}}{Q_{depth2} - k \cdot Q_{color}} = \frac{t_{on} - t_{TOF}}{t_{TOF}} \therefore t_{TOF} = \quad \text{Equation 2}$$
$$\frac{t_{depth}(Q_{depth2} - k \cdot Q_{color})}{Q_{depth1} + Q_{depth2} - 2k \cdot Q_{color}} \rightarrow \text{Depth} = \frac{c}{2} \cdot t_{TOF}$$

In this example, $t_{color}$ may denote an integration time of a color image or a background image. $t_{depth}$ may denote a time spent to transfer a charge once when obtaining a depth image. $i_{color}$ and $i_{depth}$ may denote photocurrent transferred during the integration time. K may denote a proportional constant. Also, $t_{on} = T_{dep} = t_{dep}$, and n=1, 2, ..., m−1, m. c may denote a luminous flux.

FIG. 9 illustrates another example of a cross-sectional view of a semiconductor device corresponding to FIG. 4.

An ACC node may have architecture of P+/N/P− sub. Also, the ACC node may be configured as a photogate as illustrated in FIG. 9. When the ACC node is configured as a photogate, a voltage of the ACC node may be adjusted using $V_c$.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A single gate pixel, comprising:
a light detector element;
an accumulation (ACC) node;
a first transfer unit to transfer a charge, generated by the light detector element, to the accumulation (ACC) node;
a second transfer unit to transfer the charge, accumulated in the ACC node, to a Floating Diffusion (FD) node,
wherein a potential of the ACC node is higher than a potential of the light detector element and lower than a potential of the FD node;
a connection unit to connect the light detector element to a driving voltage; and
a reset unit to reset a voltage of the FD node based on a reset control signal,
wherein a color image and a depth image are obtained from the single gate pixel and the depth image is obtained after obtaining the color image.

2. The single gate pixel of claim 1, wherein the ACC node is configured as a pinned photodiode.

3. The single gate pixel of claim 1, wherein the ACC node is configured as a photogate.

4. The single gate pixel of claim 1, wherein the first transfer unit is a transistor, a drain terminal of the transistor is connected to the light detector element, and a source terminal of the transistor is connected to the ACC node.

5. The single gate pixel of claim 1, wherein the second transfer unit is a transistor, a drain terminal of the transistor is connected to the ACC node, and a source terminal of the transistor is connected to the FD node.

6. The single gate pixel of claim 1, wherein the first transfer unit transfers the charge, generated by the light detector element, to the ACC node during an active time period, and electrically disconnects the light detector element from the ACC node during an inactive time period.

7. The single gate pixel of claim 1, wherein the reset control signal is activated when the charge accumulation is completed.

8. The single gate pixel of claim 7, wherein after the reset control signal is activated, a potential of the FD node is read out, and the second transfer unit transfers the charge, accumulated in the ACC node, to the FD node.

9. The single gate pixel of claim 1, wherein the ACC node has a P+/N/P− sub architecture.

10. The single gate pixel of claim 1, wherein the depth image is obtained using reflected light reflected by emitted light during a first measurement time period and a second measurement time period.

11. The single gate pixel of claim 10, wherein a first signal having a predetermined phase difference with the emitted light is applied to the first transfer unit and a signal having a predetermined phase difference with the first signal is applied to the connection unit during the first measurement time period.

12. The single gate pixel of claim 10, wherein a first signal having a predetermined phase difference with the emitted light is applied to the first transfer unit and a signal having a phase opposite to the first signal is applied to the connection unit during the first measurement time period.

13. The single gate pixel of claim 12, wherein the predetermined phase difference is '0' with the emitted light.

14. The single gate pixel of claim 10, wherein a waveform of the first signal is reversed by 180 degrees during the second measurement time period.

15. An operation method of a single gate pixel, the operation method comprising:
 transferring a charge, generated by a light detector element, to an accumulation (ACC) node;
 accumulating the charge in the ACC node;
 transferring the accumulated charge to a Floating Diffusion (FD) node; and
 resetting a voltage of the FD node based on a reset control signal,
 wherein a potential of the ACC node is higher than a potential of the light detector element and lower than a potential of the FD node,
 wherein a color image and a depth image are obtained from the single gate pixel and the depth image is obtained after obtaining the color image.

16. The operation method of claim 15, wherein the transferring of the charge to the ACC node transfers the charge, generated by the light detector element, to the ACC node during an active time period, and electrically disconnects the light detector element from the ACC node during an inactive time period.

17. The operation method of claim 15, wherein the reset control signal is activated when the charge accumulation is completed.

18. The operation method of claim 17, further comprising:
 reading out a potential of the FD node after activating the reset control signal; and
 then transferring the charge, accumulated in the ACC node, to the FD node.

* * * * *